US012592478B2

(12) United States Patent
Elghannai et al.

(10) Patent No.: US 12,592,478 B2
(45) Date of Patent: Mar. 31, 2026

(54) ANTENNA DESIGNS FOR HEARING INSTRUMENTS

(71) Applicant: Starkey Laboratories, Inc., Eden Prairie, MN (US)

(72) Inventors: Ezdeen Elghannai, Eden Prairie, MN (US); Casey Murray, Eden Prairie, MN (US); Ganesh Borra, Plymouth, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 170 days.

(21) Appl. No.: 18/366,477

(22) Filed: Aug. 7, 2023

(65) Prior Publication Data

US 2023/0387575 A1 Nov. 30, 2023

Related U.S. Application Data

(63) Continuation of application No. PCT/US2022/014899, filed on Feb. 2, 2022.

(60) Provisional application No. 63/148,073, filed on Feb. 10, 2021.

(51) Int. Cl.
*H01Q 1/27* (2006.01)
*H01Q 1/24* (2006.01)

(52) U.S. Cl.
CPC ............ *H01Q 1/273* (2013.01); *H01Q 1/244* (2013.01)

(58) Field of Classification Search
USPC ........................................................ 343/702
See application file for complete search history.

(56) References Cited

U.S. PATENT DOCUMENTS 5,159,347 A * 10/1992 Osterwalder ............ H01Q 7/00 324/219
5,721,783 A 2/1998 Anderson
7,256,747 B2 8/2007 Victorian et al.
7,446,720 B2 11/2008 Victorian et al.
(Continued)

FOREIGN PATENT DOCUMENTS

CN 106102831 B 8/2019
EP 2680366 B1 1/2014
(Continued)

OTHER PUBLICATIONS

International Preliminary Report on Patentability from International Application No. PCT/US2022/014899 dated Aug. 15, 2023, 7 pp.
(Continued)

*Primary Examiner* — Dimary S Lopez Cruz
*Assistant Examiner* — Brandon Sean Woods
(74) *Attorney, Agent, or Firm* — Shumaker & Sieffert, P.A.

(57) ABSTRACT

A hearing instrument comprises a housing that defines a cavity; a printed circuit board (PCB) disposed within the cavity; an antenna that comprises an internal portion and an external portion, wherein a first location on the internal portion of the antenna is disposed within the cavity and is physically connected to the PCB and a different second location on the internal portion of the antenna is physically connected to the external portion of the antenna; and a cable protruding from the housing and configured for use as a handle for removal of the hearing instrument from an ear of a user, wherein the cable encloses the external portion of the antenna.

10 Claims, 10 Drawing Sheets

(56) References Cited

U.S. PATENT DOCUMENTS

| | | | |
|---|---|---|---|
| 7,593,538 B2 | 9/2009 | Polinske | |
| 8,675,902 B2 | 3/2014 | Christensen et al. | |
| 9,167,360 B2 | 10/2015 | Polinske et al. | |
| 9,525,930 B2 | 12/2016 | Parkins | |
| 9,609,443 B2 | 3/2017 | Ruaro et al. | |
| 9,968,781 B2 | 5/2018 | Roehrlein et al. | |
| 9,972,895 B2 | 5/2018 | Hirsch et al. | |
| 10,051,388 B2 | 8/2018 | Polinske et al. | |
| 10,187,734 B2 | 1/2019 | Kvist et al. | |
| 10,362,410 B2 | 7/2019 | Ozden | |
| 10,406,372 B2 | 9/2019 | Roehrlein et al. | |
| 10,547,957 B1 | 1/2020 | Elghannai et al. | |
| 10,764,666 B1 | 9/2020 | Napoles et al. | |
| 11,057,723 B2 | 7/2021 | Elghannai et al. | |
| 11,323,833 B2 | 5/2022 | Polinske et al. | |
| 2005/0203584 A1 | 9/2005 | Twetan et al. | |
| 2013/0342407 A1* | 12/2013 | Kvist | H01Q 1/273 343/718 |
| 2013/0343586 A1 | 12/2013 | Kvist et al. | |
| 2014/0307904 A1 | 10/2014 | Polinske et al. | |
| 2015/0289062 A1 | 10/2015 | Ungstrup et al. | |
| 2016/0050502 A1 | 2/2016 | Kvist et al. | |
| 2016/0330552 A1 | 11/2016 | Flood | |
| 2017/0026762 A1 | 1/2017 | Ruaro et al. | |
| 2017/0062913 A1* | 3/2017 | Hirsch | H04B 5/26 |
| 2017/0150278 A1 | 5/2017 | Ruaro | |
| 2018/0084351 A1 | 3/2018 | Polinske et al. | |
| 2018/0124528 A1 | 5/2018 | Polinske et al. | |
| 2018/0138584 A1 | 5/2018 | Leung et al. | |
| 2018/0242074 A1 | 8/2018 | Xu et al. | |
| 2018/0352345 A1 | 12/2018 | Polinske et al. | |
| 2018/0359575 A1 | 12/2018 | Thaysen | |
| 2019/0006757 A1 | 1/2019 | Nikles et al. | |
| 2019/0069101 A1 | 2/2019 | Kvist | |
| 2019/0165456 A1 | 5/2019 | Elghannai | |
| 2019/0349694 A1 | 11/2019 | Farmakidis et al. | |
| 2020/0107141 A1* | 4/2020 | Kvist | H01Q 1/48 |
| 2020/0335856 A1 | 10/2020 | Kim et al. | |
| 2021/0067859 A1 | 3/2021 | Sakane et al. | |
| 2021/0260389 A1* | 8/2021 | Dubey | A61N 1/0573 |
| 2021/0337323 A1 | 10/2021 | Elghannai et al. | |
| 2022/0225011 A1 | 7/2022 | Elghannai et al. | |
| 2023/0412992 A1 | 12/2023 | Elghannai et al. | |

FOREIGN PATENT DOCUMENTS

| | | | |
|---|---|---|---|
| EP | 2897385 | A1 | 7/2015 |
| EP | 2983379 | A2 | 2/2016 |
| EP | 3174314 | A1 | 5/2017 |
| EP | 3531718 | A1 | 8/2019 |
| EP | 3554096 | A1 | 10/2019 |
| JP | 2002111352 | A | 4/2002 |
| JP | 2017147566 | A | 8/2017 |
| JP | 2018519739 | A | 7/2018 |
| WO | 2015147772 | A1 | 10/2015 |
| WO | 2018114063 | A1 | 6/2018 |
| WO | 2019035561 | A1 | 2/2019 |
| WO | 2019130843 | A1 | 7/2019 |
| WO | 2020132542 | A1 | 6/2020 |

OTHER PUBLICATIONS

International Search Report and Written Opinion of International Application No. PCT/US2022/014899, dated May 10, 2022, 10 pp.

Kammersgaard et al., “Body-Worn Spiral Monopole Antenna for Body-Centric Communications,” Proceedings of the 2015 International Workshop on Antenna Technology, Mar. 4-6, 2015, 4 pp.

Communication pursuant to Article 94(3) EPC from counterpart European Application No. 22705279.2 dated May 12, 2025, 5 pp.

Response to Communication Pursuant to Rules 161(1) and 162 EPC dated Sep. 19, 2023, from counterpart European Application No. 22705279.2, filed Mar. 27, 2024, 11 pp.

Response to Communication pursuant to Article 94(3) EPC dated May 12, 2025, from counterpart European Application No. 22705279.2 filed Nov. 11, 2025, 9 pp.

* cited by examiner

ANTENNA DESIGNS FOR HEARING INSTRUMENTS

This application is a continuation of International Application No. PCT/US2022/014899, filed Feb. 2, 2022, which claims priority to U.S. Provisional Patent Application No. 63/148,073, filed Feb. 10, 2021, the entire content of both of which are incorporated herein by reference.

TECHNICAL FIELD

This disclosure relates to antennas for hearing instruments.

BACKGROUND

Hearing instruments are devices designed to be worn on, in, or near one or more of a user's ears. Common types of hearing instruments include hearing assistance devices (e.g., "hearing aids"), earbuds, headphones, hearables, cochlear implants, and so on. In some examples, a hearing instrument may be implanted or integrated into a user. Some hearing instruments include additional features beyond just environmental sound-amplification. For example, some modern hearing instruments include advanced audio processing for improved device functionality, controlling and programming the devices, and beamforming, and some can even communicate wirelessly with external devices including other hearing instruments (e.g., for streaming media).

SUMMARY

This disclosure describes antenna designs for hearing instruments. There are several challenges faced by designers of antennas for hearing instruments. For example, because hearing instruments are primarily worn within the ear canals of users and because all functional components of hearing instruments are typically located within the hearing instruments themselves, the space available for antennas is limited. Also, because the functional components of hearing instruments are typically located within the hearing instruments themselves, the batteries of hearing instruments are typically quite small. Accordingly, the battery power available to transceivers is limited. As such, the antennas of hearing instruments should be efficient in order to maximize radiated power. Moreover, because some types of hearing instruments, such as completely-in-canal (CIC) hearing instruments, are primarily worn within the ear canals of users, the user's head and ear tissue may affect signals received and transmitted by antennas of hearing instruments.

This disclosure describes antennas for hearing instruments that may address one or more of these challenges. As described herein, a hearing instrument comprises a housing that defines a cavity; a printed circuit board (PCB) disposed within the cavity; an antenna that comprises an internal portion and an external portion, wherein a first location on the internal portion of the antenna is disposed within the cavity and is physically connected to the PCB and a different second location on the internal portion of the antenna is physically connected to the external portion of the antenna; and a cable protruding from the housing and configured for use as a handle for removal of the hearing instrument from an ear of a user, wherein the cable encloses the external portion of the antenna.

The details of one or more techniques of the disclosure are set forth in the accompanying drawings and the description below. Other features, objects, and advantages of the techniques described in this disclosure will be apparent from the description, drawings, and claims.

DETAILED DESCRIPTION

Wireless communication links are becoming increasingly important for hearing instruments, such as hearing aids. A hearing instrument may use wireless communication links to communicate with other hearing instruments or with other types of devices, such as mobile phones or hearing instrument accessories. Such communication may serve a wide variety of purposes, such as streaming media data and sending sensor data.

A hearing instrument requires an antenna in order to perform wireless communication. In part because of the small sizes of hearing instruments and the limited storage capacities of the batteries of hearing instruments, designing antennas for hearing instruments is challenging. This is especially the case with respect to completely-in-canal (CIC) hearing instruments, In-The-Canal (ITC) hearing instruments, In-The-Ear (ITE) hearing instruments, and Invisible-In-The-Canal (IITC) hearing instruments. Because such hearing instruments are compact in size and may be fully located inside a user's ear or ear canal, antennas for such hearing instruments may suffer from head loading. Head loading is the attenuation of electromagnetic signals by the user's head. The problem of head loading may be especially pronounced in 2.4 GHz antennas used for Bluetooth Low Energy (BLE) radio applications. This disclosure describes antennas suitable for use in hearing instruments, such as CIC hearing instruments, ITC hearing instruments, ITE hearing instruments, and IITC hearing instruments. For example, the antenna designs of the disclosure may be suitable for use in hearing instruments with BLE radio applications in the 2.4 GHz band.

Figure 1:
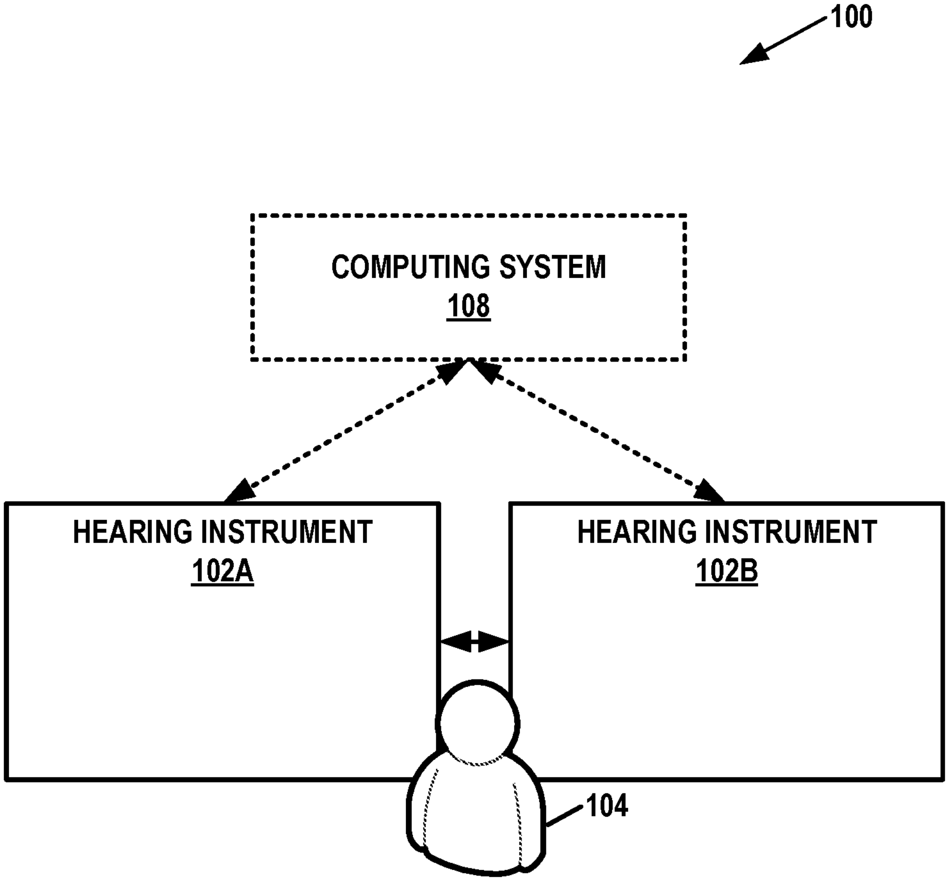
FIG. 1 is a conceptual diagram illustrating an example system that includes one or more hearing instrument(s), in accordance with one or more techniques of this disclosure.

FIG. 1 is a conceptual diagram illustrating an example system 100 that includes hearing instruments 102A, 102B, in accordance with one or more techniques of this disclosure. This disclosure may refer to hearing instruments 102A and 102B collectively, as "hearing instruments 102." A user 104 may wear hearing instruments 102. In some instances, such as when user 104 has unilateral hearing loss, user 104 may wear a single hearing instrument. In other instances, such as when user 104 has bilateral hearing loss, the user may wear two hearing instruments, with one hearing instrument for each ear of the user.

Hearing instruments 102 may comprise one or more of various types of devices that are configured to provide auditory stimuli to a user and that are designed for wear and/or implantation at, on, or near an ear of the user. Hearing instruments 102 may be worn, at least partially, in the ear canal or concha. One or more of hearing instruments 102 may include behind the ear (BTE) components that are worn behind the ears of user 104. In some examples, hearing instruments 102 comprise devices that are at least partially implanted into or integrated with the skull of the user. In some examples, one or more of hearing instruments 102 is able to provide auditory stimuli to user 104 via a bone conduction pathway.

In any of the examples of this disclosure, each of hearing instruments 102 may comprise a hearing assistance device. Hearing assistance devices include devices that help a user hear sounds in the user's environment. Example types of hearing assistance devices may include hearing aid devices, Personal Sound Amplification Products (PSAPs), cochlear implant systems (which may include cochlear implant magnets, cochlear implant transducers, and cochlear implant processors), and so on. In some examples, hearing instruments 102 are over-the-counter, direct-to-consumer, or prescription devices. Furthermore, in some examples, hearing instruments 102 include devices that provide auditory stimuli to the user that correspond to artificial sounds or sounds that are not naturally in the user's environment, such as recorded music, computer-generated sounds, or other types of sounds. For instance, hearing instruments 102 may include so-called "hearables," earbuds, earphones, or other types of devices. Some types of hearing instruments provide auditory stimuli to the user corresponding to sounds from the user's environmental and also artificial sounds.

In some examples, one or more of hearing instruments 102 includes a housing or shell that is designed to be worn in the ear for both aesthetic and functional reasons and encloses the electronic components of the hearing instrument. Such hearing instruments may be referred to as in-the-ear (ITE), in-the-canal (ITC), completely-in-the-canal (CIC), or invisible-in-the-canal (IIC) devices. In some examples, one or more of hearing instruments 102 may be behind-the-ear (BTE) devices, which include a housing worn behind the ear contains all of the electronic components of the hearing instrument, including the receiver (i.e., the speaker). The receiver conducts sound to an earbud inside the ear via an audio tube. In some examples, one or more of hearing instruments 102 may be receiver-in-canal (RIC) hearing-assistance devices, which include a housing worn behind the ear that contains electronic components and a housing worn in the ear canal that contains the receiver.

Hearing instruments 102 may implement a variety of features that help user 104 hear better. For example, hearing instruments 102 may amplify the intensity of incoming sound, amplify the intensity of certain frequencies of the incoming sound, or translate or compress frequencies of the incoming sound. In another example, hearing instruments 102 may implement a directional processing mode in which hearing instruments 102 selectively amplify sound originating from a particular direction (e.g., to the front of the user) while potentially fully or partially canceling sound originating from other directions. In other words, a directional processing mode may selectively attenuate off-axis unwanted sounds. The directional processing mode may help users understand conversations occurring in crowds or other noisy environments. In some examples, hearing instruments 102 may use beamforming or directional processing cues to implement or augment directional processing modes.

In some examples, hearing instruments 102 may reduce noise by canceling out or attenuating certain frequencies. Furthermore, in some examples, hearing instruments 102 may help user 104 enjoy audio media, such as music or sound components of visual media, by outputting sound based on audio data wirelessly transmitted to hearing instruments 102.

Hearing instruments 102 may be configured to communicate with each other. For instance, in any of the examples of this disclosure, hearing instruments 102 may communicate with each other using one or more wirelessly communication technologies. Example types of wireless communication technology include Near-Field Magnetic Induction (NFMI) technology, a 2.4 GHz technology, a BLUETOOTH™ technology, a WI-FI™ technology, audible sound signals, ultrasonic communication technology, infrared communication technology, an inductive communication technology, or another type of communication that does not rely on wires to transmit signals between devices. In some examples, hearing instruments 102 use a 2.4 GHz frequency band for wireless communication. In some examples of this disclosure, hearing instruments 102 may communicate with each other via non-wireless communication links (e.g., in addition to wireless communication links), such as via one or more cables, direct electrical contacts, and so on.

As shown in the example of FIG. 1, system 100 may also include a computing system 108. In other examples, system 100 does not include computing system 108. Computing system 108 comprises one or more computing devices, each of which may include one or more processors. For instance, computing system 108 may comprise one or more mobile devices, server devices, personal computer devices, handheld devices, wireless access points, smart speaker devices, smart televisions, medical alarm devices, smart key fobs, smartwatches, smartphones, motion or presence sensor devices, smart displays, screen-enhanced smart speakers, wireless routers, wireless communication hubs, prosthetic devices, mobility devices, special-purpose devices, accessory devices, and/or other types of devices. Accessory devices may include devices that are configured specifically for use with hearing instruments 102. Example types of accessory devices may include charging cases for hearing instruments 102, storage cases for hearing instruments 102, media streamer devices, phone streamer devices, external microphone devices, remote controls for hearing instruments 102, and other types of devices specifically designed for use with hearing instruments 102. Actions described in this disclosure as being performed by computing system 108 may be performed by one or more of the computing devices of computing system 108. One or more of hearing instruments 102 may communicate with computing system 108 using wireless or non-wireless communication links. For instance, hearing instruments 102 may communicate with computing system 108 and/or each other using any of the example types of communication technologies described elsewhere in this disclosure.

For example, hearing instruments 102 may communicate with computing system 108 and/or each other using antennas conforming to the antenna designs described in this disclosure, e.g., with respect to FIG. 3A through FIG. 6E. As described in greater detail below, one or more of hearing instruments 102 may comprise an antenna that comprises an internal portion and an external portion. A first location on the internal portion of the antenna is disposed within a cavity defined by a housing of the hearing instrument. The first location is physically connected to a printed circuit board (PCB) of the hearing instrument. A different second location on the internal portion of the antenna is physically connected to the external portion of the antenna. A cable protrudes from the housing and is configured for use as a handle for removal of the hearing instrument from an ear of user 104. The cable encloses the external portion of the antenna. The use of an antenna having such an internal portion and external portion may be compact and may have strong wireless performance resulting in an improved user experience.

Figure 2:
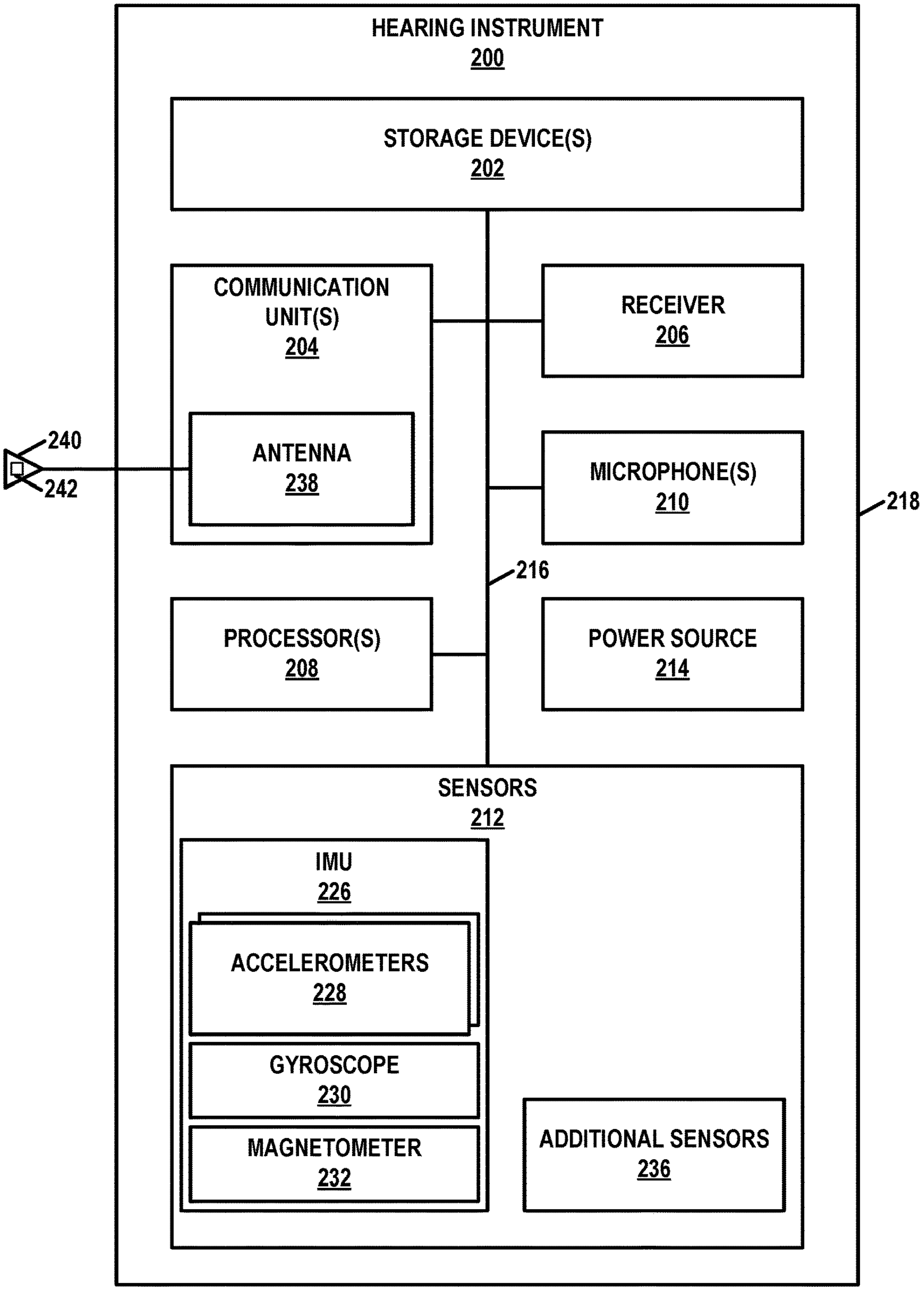
FIG. 2 is a block diagram illustrating example components of a hearing instrument, in accordance with one or more techniques of this disclosure.

FIG. 2 is a block diagram illustrating example components of a hearing instrument 200, in accordance with one or more techniques of this disclosure. Hearing instrument 200 may be either one of hearing instruments 102. In the example of FIG. 2, hearing instrument 200 comprises one or more storage devices 202, one or more communication unit(s) 204, a receiver 206, one or more processor(s) 208, one or more microphone(s) 210, a set of sensors 212, a power source 214, and one or more communication channels 216. Communication channels 216 provide communication between storage devices 202, communication unit(s) 204, receiver 206, processor(s) 208, a microphone(s) 210, and sensors 212. Components 202, 204, 206, 208, 210, and 212 may draw electrical power from power source 214. In the example of FIG. 2, each of components 202, 204, 206, 208, 210, 212, 214, and 216 are contained within a single housing 218.

Furthermore, in the example of FIG. 2, sensors 212 include an inertial measurement unit (IMU) 226 that is configured to generate data regarding the motion of hearing instrument 200. IMU 226 may include a set of sensors. For instance, in the example of FIG. 2, IMU 226 includes one or more of accelerometers 228, a gyroscope 230, a magnetometer 232, combinations thereof, and/or other sensors for determining the motion of hearing instrument 200. Furthermore, in the example of FIG. 2, hearing instrument 200 may include one or more additional sensors 236. Additional sensors 236 may include a photoplethysmography (PPG) sensor, blood oximetry sensors, blood pressure sensors, electrocardiograph (EKG) sensors, body temperature sensors, electroencephalography (EEG) sensors, environmental temperature sensors, environmental pressure sensors, environmental humidity sensors, skin galvanic response sensors, and/or other types of sensors. In other examples, hearing instrument 200 and sensors 212 may include more, fewer, or different components.

Storage devices 202 may store data. Storage devices 202 may comprise volatile memory and may therefore not retain stored contents if powered off. Examples of volatile memories may include random access memories (RAM), dynamic random access memories (DRAM), static random access memories (SRAM), and other forms of volatile memories known in the art. Storage devices 202 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories.

Communication unit(s) 204 may enable hearing instrument 200 to send data to and receive data from one or more other devices, such as another hearing instrument, an accessory device, a mobile device, or another types of device. Communication unit(s) 204 may enable hearing instrument 200 using wireless or non-wireless communication technologies. For instance, communication unit(s) 204 enable hearing instrument 200 to communicate using one or more of various types of wireless technology, such as a BLUETOOTH™ technology, 3G, 4G, 4G LTE, 5G, ZigBee, WI-FI™, Near-Field Magnetic Induction (NFMI), ultrasonic communication, infrared (IR) communication, or another wireless communication technology. In some examples, communication unit(s) 204 may enable hearing instrument 200 to communicate using a cable-based technology, such as a Universal Serial Bus (USB) technology. Communication unit(s) 204 may include radio transceivers.

As shown in the example of FIG. 2, communication unit(s) 204 include an antenna 238. Antenna 238 may be implemented in accordance with any of the example antenna designs described in this disclosure, such as the antenna designs described with respect to FIG. 3A through FIG. 6E. In the example of FIG. 2, antenna 238 includes an external portion 240 that extends outside housing 218 of hearing instrument 200. In some examples, one or more discrete components 242, such as one or more chip antenna, are physically connected to external portion 240 of antenna 238.

Receiver 206 comprises one or more speakers for generating audible sound. Microphone(s) 210 detects incoming sound and generates one or more electrical signals (e.g., an analog or digital electrical signal) representing the incoming sound.

Processor(s) 208 may be processing circuits configured to perform various activities. For example, processor(s) 208 may process the signal generated by microphone(s) 210 to enhance, amplify, or cancel-out particular channels within the incoming sound. Processor(s) 208 may then cause receiver 206 to generate sound based on the processed signal. In some examples, processor(s) 208 include one or more digital signal processors (DSPs). In some examples, processor(s) 208 may cause communication unit(s) 204 to transmit one or more of various types of data. For example, processor(s) 208 may cause communication unit(s) 204 to transmit data to computing system 108. Furthermore, communication unit(s) 204 may receive audio data from computing system 108 and processor(s) 208 may cause receiver 206 to output sound based on the audio data.

Figure 3A:
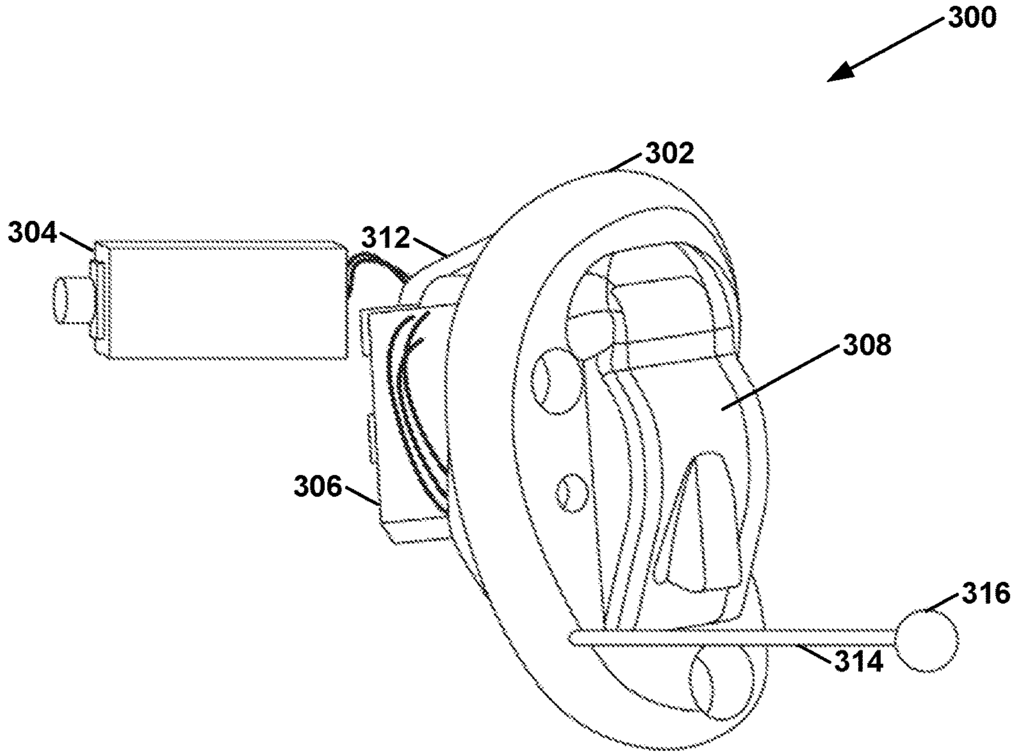
FIG. 3A is a conceptual diagram illustrating a view of an example hearing instrument, in accordance with one or more techniques of this disclosure.
Figure 3B:
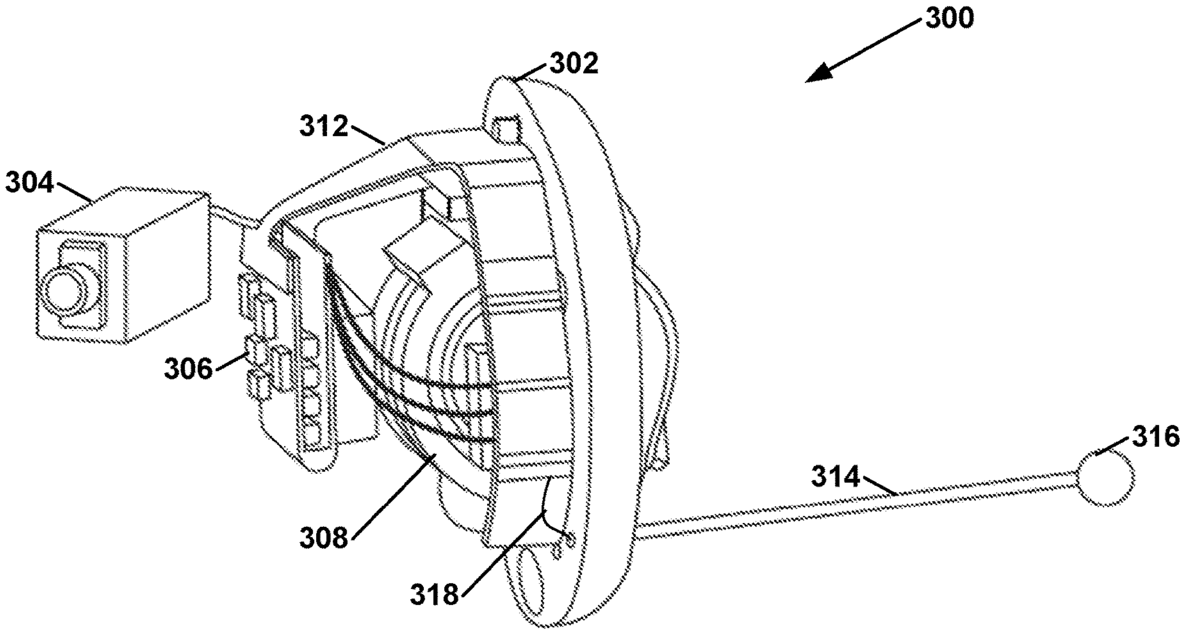
FIG. 3B is a conceptual diagram illustrating a rotated view of the hearing instrument of FIG. 3A, in accordance with one or more techniques of this disclosure.
Figure 3C:
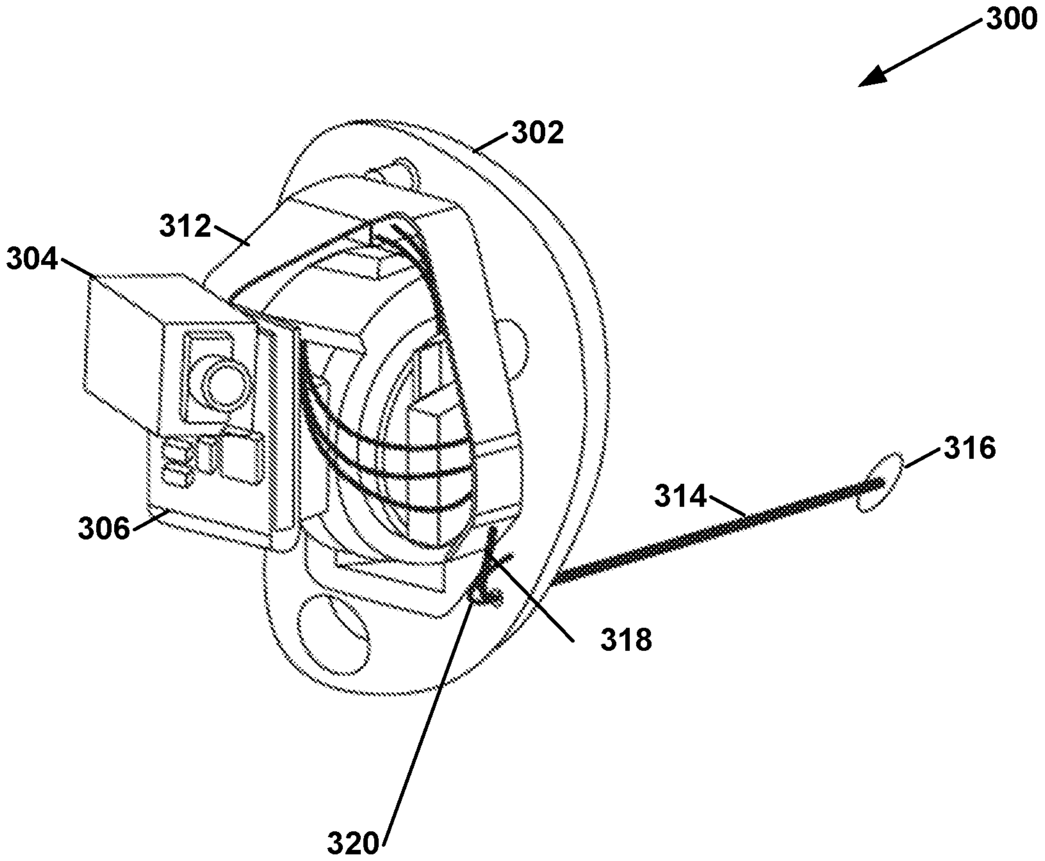
FIG. 3C is a conceptual diagram illustrating a further rotated view of the hearing instrument of FIG. 3A, in accordance with one or more techniques of this disclosure.

FIG. 3A is a conceptual diagram illustrating a view of an example hearing instrument 300, in accordance with one or more techniques of this disclosure. FIG. 3B is a conceptual diagram illustrating a rotated view of hearing instrument 300, in accordance with one or more techniques of this disclosure. FIG. 3C is a conceptual diagram illustrating a further rotated view of hearing instrument 300, in accordance with one or more techniques of this disclosure. Hearing instrument 300 may be either one of hearing instruments 102 (FIG. 1) or an example of hearing instrument 200 (FIG. 2). In the example of FIG. 3A, FIG. 3B, and FIG. 3C, hearing instrument 300 is a CIC hearing instrument.

As shown in the example of FIG. 3A, FIG. 3B, and FIG. 3C hearing instrument 300 includes a faceplate 302, a receiver 304, and a printed circuit board (PCB) 306. Faceplate 302 may form part of a housing (e.g., housing 218) of hearing instrument 300. The housing of hearing instrument 300 may also include a shell (not shown in FIG. 3A) that contains receiver 304 and PCB 306. A battery bay door 308 is connected to faceplate 302. Battery bay door 308 may allow user access to a battery contained within a battery housing 310. In other examples, such as examples where hearing instrument 300 has a rechargeable battery, faceplate 302 does not include battery bay door 308. One or more processors (e.g., processor(s) 208 of FIG. 2) and/or communication unit(s) 204 may be included in PCB 306.

Furthermore, in the example of FIG. 3A, FIG. 3B, and FIG. 3C, hearing instrument 300 includes an antenna (e.g., antenna 238 of FIG. 2) that includes an internal portion 312 and an external portion (e.g., external portion 240 of FIG. 2). In the example of FIG. 3A, FIG. 3B, and FIG. 3C, the external portion of the antenna is at least partially enclosed within a cable 314. In some examples, cable 314 may be used as a pull-cable that user 104 may use to pull hearing instrument 300 out of the ear canal of user 104. In some examples, such as the examples of FIG. 3A, FIG. 3B, and FIG. 3C, cable 314 is generally straight. In other examples, cable 314 (along with the external portion of the antenna) may be curved, and in some examples, curve back completely to touch an outer surface of faceplate 302.

In some examples, the external portion of the antenna (e.g., antenna 238 of FIG. 2) runs along an external surface of faceplate 302 for all or part of its length. In such examples, parts of the external portion of the antenna running along the external surface of faceplate 302 may run within a groove defined in faceplate 302 or atop faceplate 302. In some examples where at least part of the external portion of the antenna runs along the external surface of faceplate 302, the external portion of the antenna may be exposed. In some examples where at least part of the external portion of the antenna runs along the external surface of faceplate 302, the external portion of the antenna may be enclosed within a covering member. In some examples where at least part of the external portion of the antenna runs along the external surface of faceplate 302, another part of the external portion of the antenna may be enclosed within a cable that protrudes from the housing (e.g., faceplate 302). In some examples where the antenna runs along an external surface of faceplate 302, hearing instrument 300 does not include a cable configured for use as a handle for removal of the hearing instrument from an ear of a user.

In some examples, the external portion of the antenna may be between 13 millimeters (mm) and 18 mm in length. In other examples, the external portion of the antenna may have other lengths. In some examples, the external portion of the antenna may comprise one or more wires. In examples where the external portion of the antenna comprises one or more wires, the one or more wires may be twisted around each other one or more times. Different numbers of turns may result in different radiation characteristics of the antenna. In some examples, a dielectric material may partially or totally enclose at least a portion of the one or more wires of the external portion of the antenna. In some examples, the one or more wires of the external portion of the antenna are formed from copper. In other examples, the one or more wires of the external portion of the antenna may be formed from other materials. In some examples, the external portion of the antenna may comprise copper traces instead of wires. The traces may have a generally rectangular profile along one or more dimensions. In some examples, the external portion of the antenna may comprise a metal deposited on a structural element or over-molded part.

Figure 7:
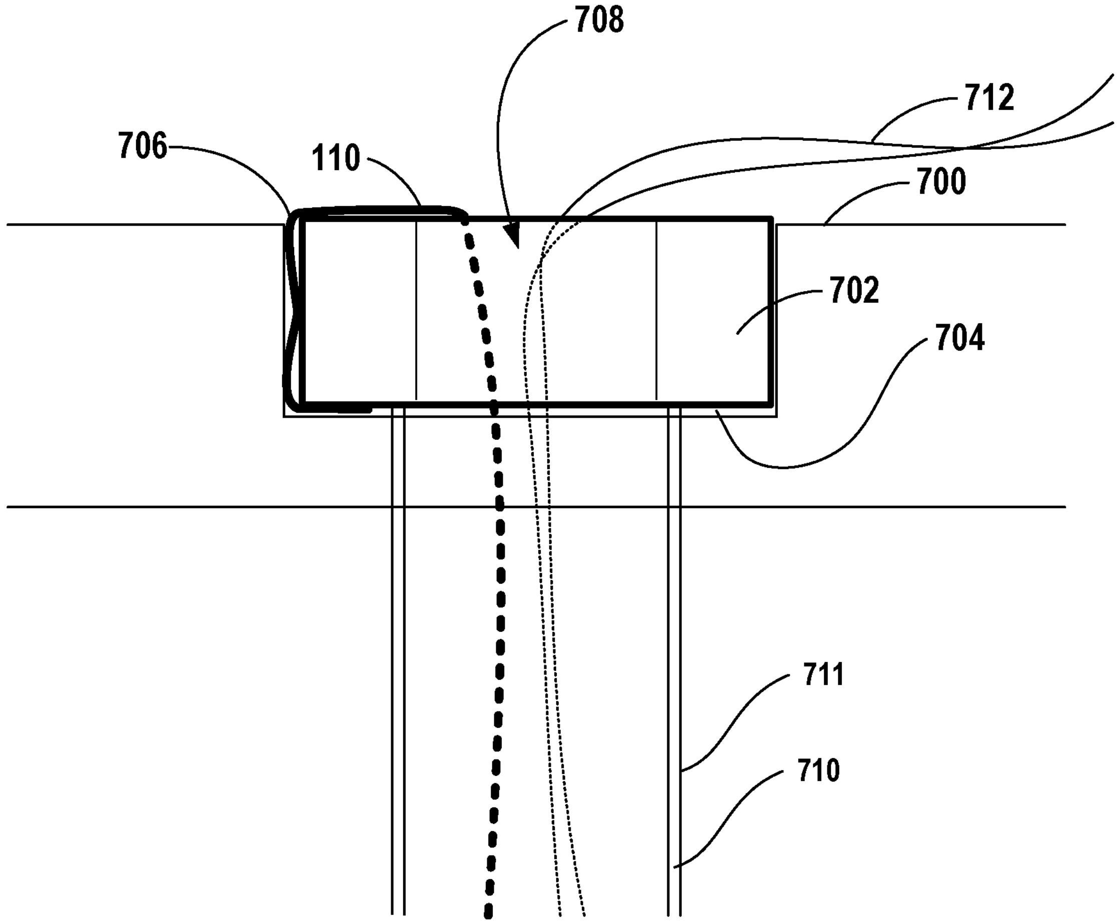
FIG. 7 is a conceptual diagram illustrating in greater detail an example hearing device with an external antenna portion and a plurality of fibers accordance with one or more techniques of this disclosure.

Cable 314 may comprise a sleeve that contains the external portion of the antenna. In some examples, the sleeve may also contain reinforcing fibers 320, such as Aramid fibers, that connect to a surface of faceplate 302 or the shell of hearing instrument 300. In some examples, the sleeve of cable 314 forms part of the housing of hearing instrument 300. In other examples, the sleeve of cable 314 does not form part of the housing of hearing instrument 300. Thus, cable 314 may protrude from the housing in the sense that cable 314 forms a part of the housing that protrudes from other parts of the housing, or in other examples, cable 314 may protrude from the housing in the sense that cable 314 protrudes through or from the housing without forming part of the housing. The sleeve may be formed from one or more materials, such as a polyether block amide or other thermoplastic elastomer. As shown in the example of FIG. 3A, the sleeve of cable 314 extends through a hole defined in faceplate 302. FIG. 7, which is described in greater detail below, shows an example structure of cable 314.

In the example of FIG. 3A, FIG. 3B, and FIG. 3C, cable 300 includes a terminal member 316 at a distal end of cable 300. Terminal member 316 may have various shapes, such as a ball (e.g., as shown in FIG. 3A, FIG. 3B, and FIG. 3C), cube, pyramid, or other shape. In some examples, terminal member 316 may be formed from a metallic material, such as copper or an alloy. Terminal member 316 may make it easier for user 104 to grasp cable 314 when pulling hearing instrument 300 out of the ear of user 104. In some examples, terminal member 316 includes one or more sensors or switches. For instance, terminal member 316 may include a switch for turning hearing instrument 300, or one or more features of hearing instrument 300, on or off. Example sensors included in terminal member 316 may include temperature sensors, light sensors, humidity sensors, or other types of sensors. In some examples, terminal member 316 is part of the external portion of the antenna.

As shown in FIG. 3B, internal portion 312 of the antenna is connected to PCB 306. Additionally, internal portion 312 of the antenna is connected to the external portion of the antenna via a conductor 318. Conductor 318 may comprise a wire, pin, planar conductor, connector, etc. and may be integral to the external portion of the antenna.

In the example of FIG. 3A, FIG. 3B, and FIG. 3C, internal portion 312 of the antenna may extend laterally along an inner superior surface of the shell of hearing instrument 300 and then along a posterior edge of an inner surface of faceplate 302. Internal portion 312 of the antenna may be formed from a metal, such as copper. In this disclosure, posterior refers to a direction toward a back of user 104, anterior refers to a direction toward a front of user 104, superior refers to a headward direction, and inferior refers to a direction toward the feet of user 104. Internal portion 312 of the antenna may comprise a flexed shaped sheet of metal or other conductive material.

Figure 4:
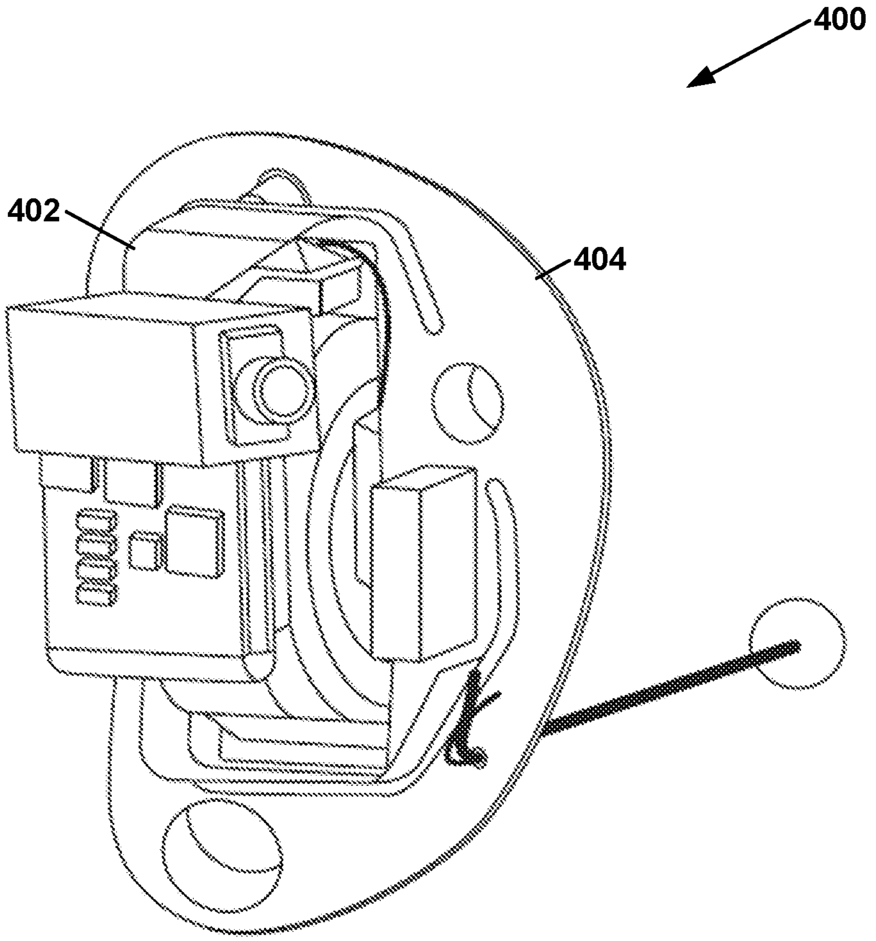
FIG. 4 is a conceptual diagram illustrating a view of an example hearing instrument, in accordance with one or more techniques of this disclosure.

FIG. 4 is a conceptual diagram illustrating a view of an example hearing instrument 400, in accordance with one or more techniques of this disclosure. Hearing instrument 400 may be either one of hearing instruments 102 (FIG. 1) or an example of hearing instrument 200 (FIG. 2). In the example of FIG. 4, hearing instrument 400 is a CIC hearing instrument. Hearing instrument 400 is similar in most respects to hearing instrument 300 of FIG. 3A, FIG. 3B, and FIG. 3C. However, in contrast to hearing instrument 300, an internal portion 402 of an antenna of hearing instrument 400 extends along an anterior edge of an inner surface of faceplate 404 of hearing instrument 400 instead of the posterior edge of faceplate 302 of hearing instrument 300.

The different orientations of the antennas in hearing instrument 300 and hearing instrument 400 may result in different radiation patterns. For instance, the radiation pattern generated by hearing instrument 300 may be stronger toward the front of the head of user 104 while the radiation pattern generated by hearing instrument 400 may be relatively stronger toward the top and back of the head of user 104. Having a stronger radiation pattern toward the front of the head of user 104 may have advantages for communication with certain types of devices, such as mobile phones and computers. Having a stronger radiation pattern toward the top and back of the head of user 104 may have advantages in communication between hearing instruments worn by user 104. In general, increasing a length of the internal and/or external portions of the antenna increases radiated power of the antenna. Thus, the combination of the internal and external portions of the antenna may increase the radiated power of the antenna.

Figure 5:
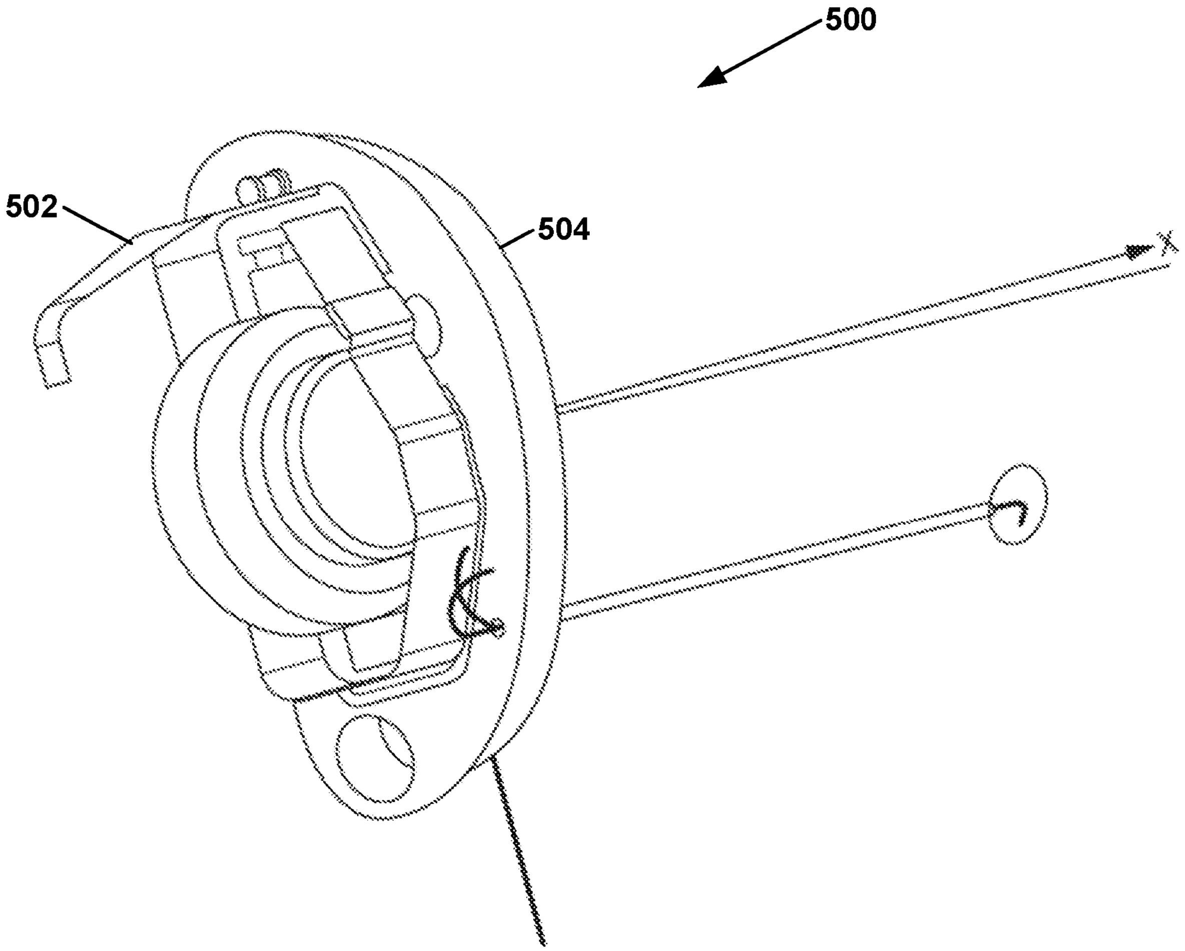
FIG. 5 is a conceptual diagram illustrating a view of an example hearing instrument, in accordance with one or more techniques of this disclosure.

FIG. 5 is a conceptual diagram illustrating a view of an example hearing instrument 500, in accordance with one or more techniques of this disclosure. Hearing instrument 500 may be either one of hearing instruments 102 (FIG. 1) or an example of hearing instrument 200 (FIG. 2). In the example of FIG. 5, hearing instrument 500 is a CIC hearing instrument. Hearing instrument 500 is similar in most respects to hearing instrument 300 of FIG. 3A, FIG. 3B, and FIG. 3C. However, in contrast to hearing instrument 300 and hearing instrument 400 of FIG. 4, an internal portion 502 of an antenna of hearing instrument 500 extends along an anterior side of the housing (e.g., an anterior edge of an inner surface of faceplate 404 of hearing instrument 400) and also the posterior edge of the inner surface of faceplate 404 of hearing instrument 300.

Figure 6A:
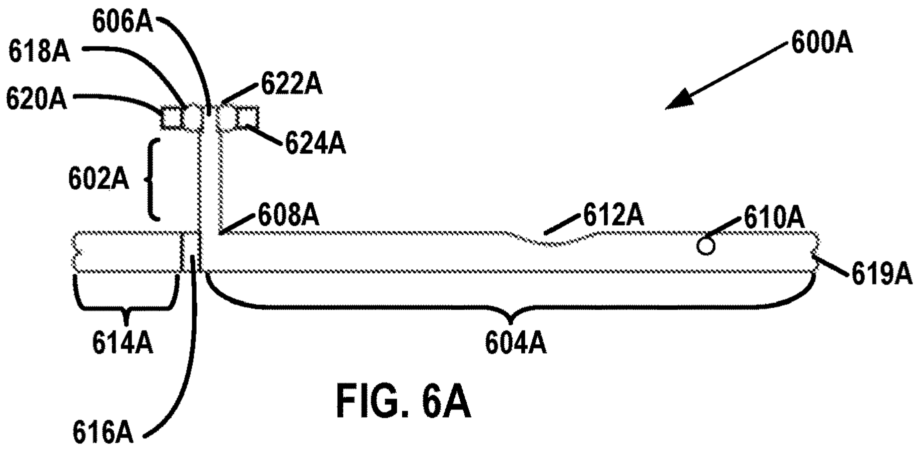
FIG. 6A is a conceptual diagram illustrating a first example internal antenna structure, in accordance with one or more techniques of this disclosure.
Figure 6B:
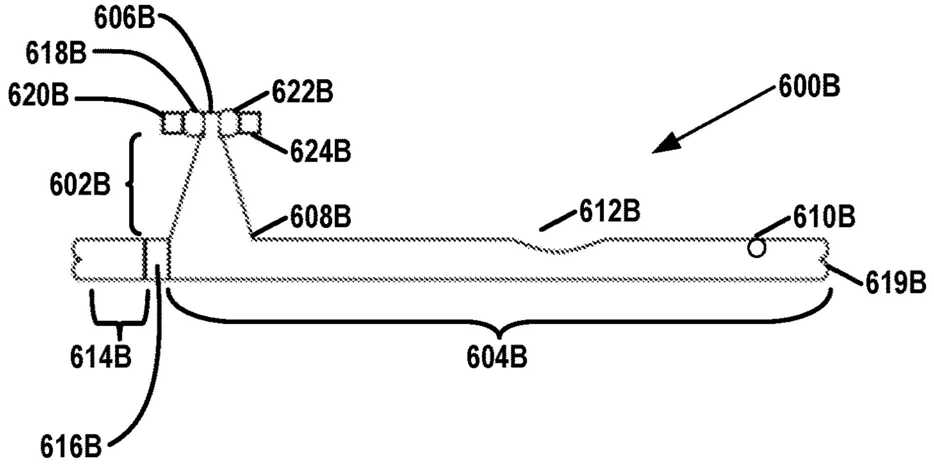
FIG. 6B is a conceptual diagram illustrating a second example internal antenna structure, in accordance with one or more techniques of this disclosure.
Figure 6C:
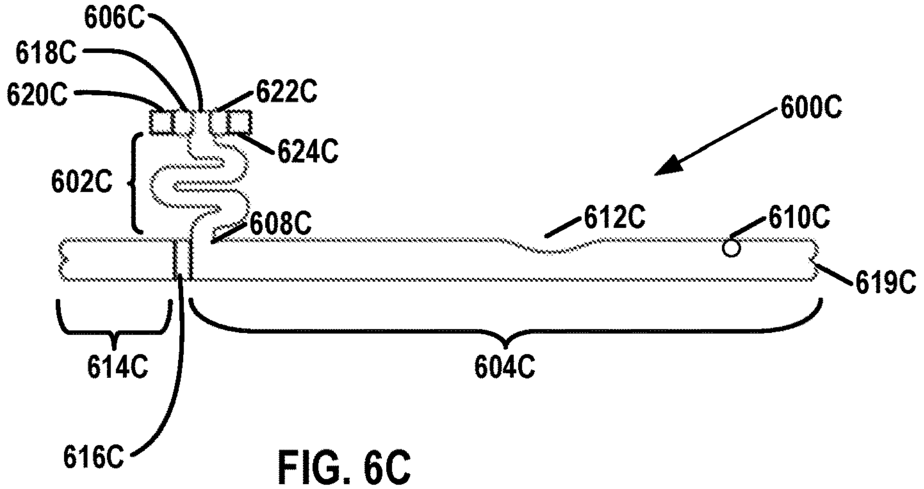
FIG. 6C is a conceptual diagram illustrating a third example internal antenna structure, in accordance with one or more techniques of this disclosure.
Figure 6D:
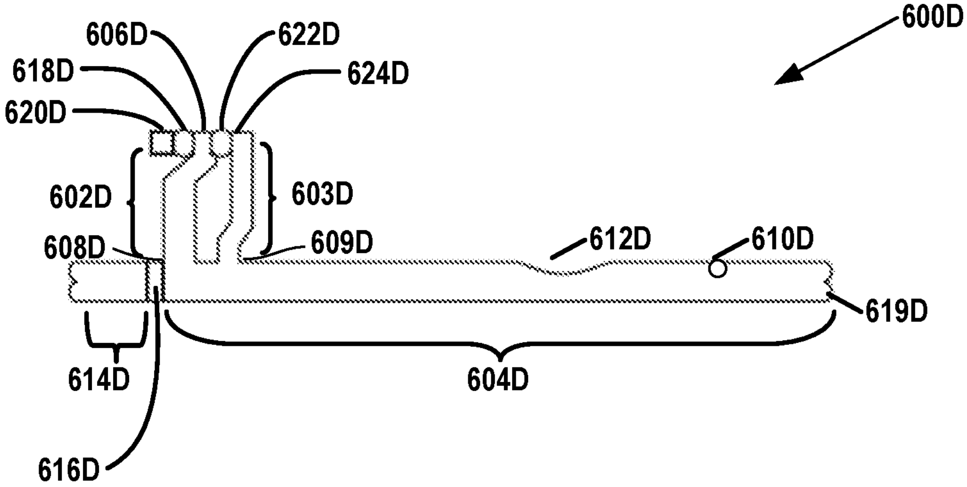
FIG. 6D is a conceptual diagram illustrating a fourth example internal antenna structure, in accordance with one or more techniques of this disclosure.
Figure 6E:
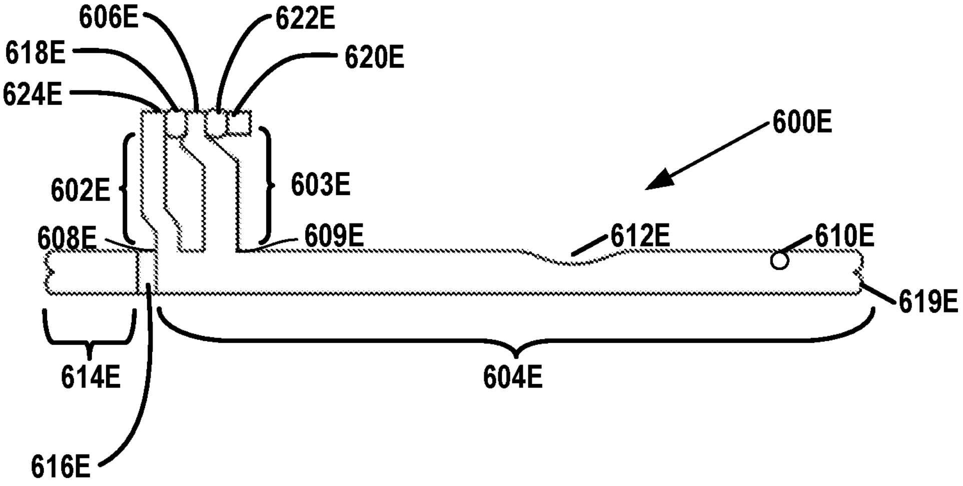
FIG. 6E is a conceptual diagram illustrating a fifth example internal antenna structure, in accordance with one or more techniques of this disclosure.
Figure 6F:
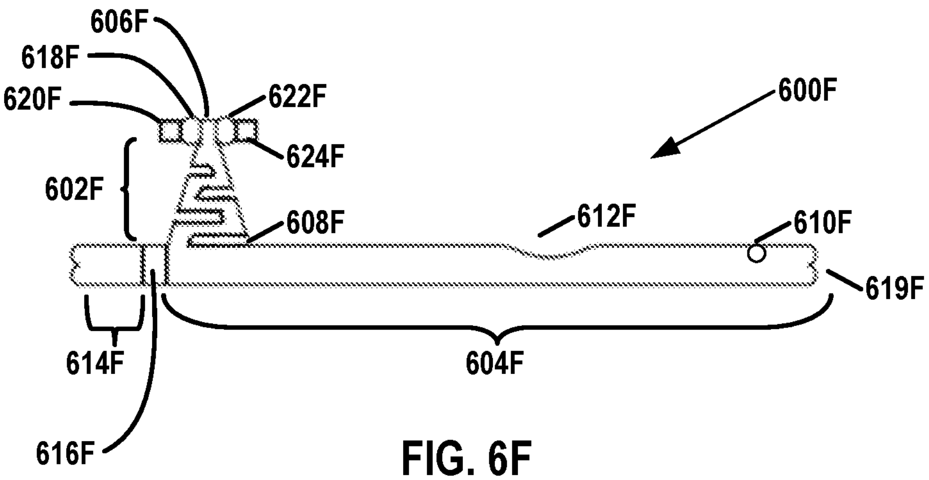
FIG. 6F is a conceptual diagram illustrating a sixth example internal antenna structure, in accordance with one or more techniques of this disclosure.

FIG. 6A is a conceptual diagram illustrating a first example internal antenna structure 600A, in accordance with one or more techniques of this disclosure. FIG. 6B is a conceptual diagram illustrating a second example internal antenna structure 600B, in accordance with one or more techniques of this disclosure. FIG. 6C is a conceptual diagram illustrating a third example internal antenna structure 600C, in accordance with one or more techniques of this disclosure. FIG. 6D is a conceptual diagram illustrating a fourth example internal antenna structure 600D, in accordance with one or more techniques of this disclosure. FIG. 6E is a conceptual diagram illustrating a fifth example internal antenna structure 600E, in accordance with one or more techniques of this disclosure. FIG. 6F is a conceptual diagram illustrating a sixth example internal antenna structure, in accordance with one or more techniques of this disclosure. Internal antenna structures 600A, 600B, 600C, 600D, 600E, and 600F may include the internal portions of antennas of hearing instruments 102 (FIG. 1).

In the example of FIG. 6A, internal antenna structure 600A includes a first segment 602A and a second segment 604A. First segment 602A may connect to PCB 306 (FIGS. 3A, 3B, 3C) at location 606A. In some examples, first segment 602A may extend along an inner surface of a superior side of the housing from location 606A to a junction 608A with second segment 604A. First segment 602A has a linear shape.

In some examples, such as the example of FIGS. 3A-3C, second segment 604A extends along an inner surface of a posterior side of the housing and an inferior side of the housing. In some such examples, such as the example of FIG. 5, second segment 604A may further extend along an inner surface of a posterior side of the housing. In some examples, such as the example of FIG. 4, second segment 604A extends along an inner surface of an anterior side of the housing and an inferior side of the housing. In some such examples, such as the example of FIG. 5, second segment 604A may further extend along an inner surface of the anterior side of the housing. An external portion of the antenna may physically connect to the second segment 604A at a location 610A. Second segment 604A may be substantially rectangular in shape when flat but defining an indentation 612A on one side. For instance, opposite sides of second segment 604A may be generally parallel (with, in some examples, the exception of indentation 612A). The size and depth of indentation 612A may change the current distribution within second segment 604A. In some examples, second segment 604A may have various extensions, branches, slots, slits, or other protrusions or indentations. In the examples of FIG. 6A-6F, second segments 604A-604F may include additional discrete components, such as chip antennas or inductors.

Internal antenna structure 600A may also include a third segment 614A that extends in an opposite direction from second segment 604A at junction 608A. Third segment 614 may be formed from the same material as first segment 602A and second segment 604A. Internal antenna structure 600A may also include an insulating strip 616A that physically connects an end of second segment 604A to an end of third segment 614A and substantially prevents electrical current from flowing directly between second segment 604A and third segment 614A via insulating strip 616A. For instance, insulating strip 616A may be formed from a plastic or other material with a high dielectric constant. In other examples, insulating strips 616A-616F are omitted and air gaps are present instead.

In some examples, when installed in a hearing instrument, an end 619A of second segment 604A may connect to third segment 614A. Thus, second segment 604A, third segment 614A, and insulating strip 616A may form a physical ring. Forming a physical ring in this manner may help to secure internal antenna structure 600A within a hearing instrument during and/or after manufacture of the hearing instrument. However, because insulating strip 616A comprises an electrically insulating material, electrical current does not flow all the way around the ring during operation of the hearing instrument. In other examples, third segment 614A is not connected to end 619A of second segment 604A. In such examples, third segment 614A may be used for securing internal antenna structure 600A within the hearing instrument during and/or after assembly of the hearing instrument.

In some examples, a length of second segment 604A (e.g., as determined from insulating strip 616C to end 619C) may be 1400 millimeters. In some examples, a width of second segment 604A is in a range of 5 to 120 millimeters.

In the example of FIG. 6A, internal antenna structure 600A may further include insulating strips 618A, 622A, and fixation segments 620A, 624A. Fixation segments 620A, 624A and insulating strips 618A, 622A may be used to secure first segment 602A to a PCB (e.g., PCB 306).

In the example of FIG. 6B, internal antenna structure 600B includes first segment 602B, second segment 604B, third segment 614B, insulating strips 616B, 618B, 622B, and fixation segments 620B, 624B. First segment 602B meets second segment 604B at junction 608B. Second segment 604B may define an indentation 612B and has an end 619B. In other examples, second segment 604B does not define indentation 612B. In some examples, second segment 604B may have various extensions, branches, slots, slits, or other protrusions or indentations. An external portion of the antenna may be attached to second segment 604B at a location 610B. Internal antenna structure 600B is similar in most respects to internal antenna structure 600A and may be used in the same way as internal antenna structure 600A. Internal antenna structure 600B differs from internal antenna structure 600A in that first segment 602B is substantially triangular. In other words, opposite edges of first segment 602B converge toward a location 606B at which first segment 602B is attached to the PCB. In other examples, the angle of convergence of the opposite edges of first segment 602B may change one or more times. For instance, in some examples, the angle of convergence of the opposite edges of first segment 602B may change such that the opposite sides converge more quickly or less quickly at a given point. In other examples, the first segment 602B may include a linear or meandered region that transitions to a flared (e.g., trapezoidal) region.

In the example of FIG. 6C, internal antenna structure 600C includes first segment 602C, second segment 604C, third segment 614C, insulating strips 616C, 618C, 622C, and fixation segments 620C, 624C. First segment 602C meets second segment 604C at junction 608C. Second segment 604C may define an indentation 612C and has an end 619C. In other examples, second segment 604C does not define indentation 612C. In some examples, second segment 604C may have various extensions, branches, slots, slits, or other protrusions or indentations. An external portion of the antenna may be attached to second segment 604C at a location 610C. Internal antenna structure 600C is similar in most respects to internal antenna structures 600A, 600B and may be used in the same way as internal antenna structures 600A, 600B. Internal antenna structure 600C differs from internal antenna structures 600A, 600B in that first segment 602C comprises a meandered trace.

In the example of FIG. 6D, internal antenna structure 600D includes segments 602D, 603D, 604D, and 614D. Internal antenna structure 600D also includes insulating strips 616D, 618D, 622D. Internal antenna structure 600D includes fixation segment 620D. Segments 602D, 603D meet second segment 604C at junctions 608D, 609D, respectively. Segment 604D may define an indentation 612D and has an end 619D. In other examples, segment 604D does not define indentation 612D. In some examples, segment 604D may have various extensions, branches, slots, slits, or other protrusions or indentations. An external portion of the antenna may be attached to segment 604D at a location 610D. Internal antenna structure 600D is similar in most respects to internal antenna structures 600A, 600B, 600C and may be used in the same way as internal antenna structures 600A, 600B, 600C. Internal antenna structure 600D differs primarily from internal antenna structures 600A, 600B, and 600C in that internal antenna structure 600D has two segments having two separate contact locations (606D, 624D) with the PCB. One of contact locations 606D or 624D may be connected to a signal source and the other of contact locations 606D and 624D may be connected to a ground.

In the example of FIG. 6E, internal antenna structure 600E includes segments 602E, 603E, 604E, and 614E. Internal antenna structure 600E also includes insulating strips 616E, 618E, 622E. Internal antenna structure 600E includes fixation segment 620E. Segments 602E, 603E meet segment 604E at junctions 608E, 609E, respectively. Segment 604E may define an indentation 612E and has an end 619E. In other examples, segment 604E does not define indentation 612E. In some examples, segment 604E may have various extensions, branches, slots, slits, or other protrusions or indentations. An external portion of the antenna may be attached to segment 604E at a location 610E. Internal antenna structure 600E is similar in most respects to internal antenna structures 600A, 600B, 600C, 600D and may be used in the same way as internal antenna structures 600A, 600B, 600C, 600D. Internal antenna structure 600E differs primarily from internal antenna structure 600D in that the shapes of segments 602E and 603E are reversed relative to segments 602D and 603D of FIG. 6D. One of contact locations 606E or 624E may be connected to a signal source and the other of contact locations 606E and 624E may be connected to a ground.

In the example of FIG. 6F, internal antenna structure 600F includes first segment 602F, second segment 604F, third segment 614F, insulating strips 616F, 618F, 622F, and fixation segments 620F, 624F. First segment 602F meets second segment 604F at junction 608F. Second segment 604F may define an indentation 612F and has an end 619F. In some examples, end 619F is connected to third segment 614F. In other examples, second segment 604B does not define indentation 612F. In some examples, second segment 604F may have various extensions, branches, slots, slits, or other protrusions or indentations. An external portion of the antenna may be attached to second segment 604F at a location 610F. Internal antenna structure 600F is similar in most respects to internal antenna structure 600A, 600B, 600C, 600D, and 600E and may be used in the same way as internal antenna structure 600A, 600B, 600C, 600D, and 600E. Internal antenna structure 600F differs from internal antenna structure 600B in that the substantially triangular first segment 602F defines one or more notches, and therefore is meandered. The presence of the notches may increase the flexibility of first segment 602F. The increased flexibility of first segment 602F may reduce the likelihood of segment 602F detaching from the PCB or breaking. Although the corners of the notches are shown with sharp angles in the example of FIG. 6F, the corners of the notches may have radiused or curved angles. Furthermore, although the examples of 6A-6F have insulating strips and fixation segments at their contact locations, such insulating strips and fixation segments may be omitted.

Internal antenna structures 600A through 600F may have different electrical characteristics. For example, internal antenna structure 600B may have more constant impedance across a frequency band from 2.4 GHz to 2.6 GHz than other internal antenna structures and there may be less impact from head loading. This may allow internal antenna structure 600B to have a wider bandwidth than other designs. The design of internal antenna structure 600B may also reduce the complexity of an impedance matching network for an antenna that includes internal antenna structure 600C.

Figure 6G:
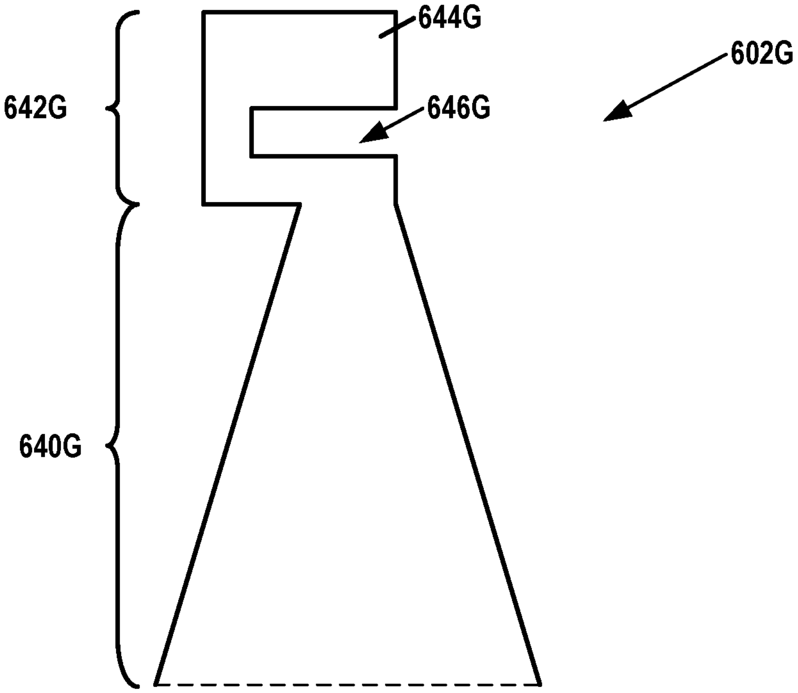
FIG. 6G is a conceptual diagram illustrating an example connection element of an internal antenna structure, in accordance with one or more techniques of this disclosure.

FIG. 6G is a conceptual diagram illustrating an example connection segment 602G of an internal antenna structure, in accordance with one or more techniques of this disclosure. Connection segment 602G may be a segment of an internal antenna structure, such as any of segments 602A, 602B, 602C, 602D, 603D, 602E, 603E, or 602F, that is connected to a PCB of a hearing instrument. In the example of FIG. 6G, a first portion 640G of connection segment 602G is generally triangular in shape. However, in other examples, portion 640G may have other shapes, such as the rectangular shape of segment 602A of FIG. 6A, the sinuous shape of segment 602C of FIG. 6C, the shapes of segments 602D, 603D, 602E, or 603E of FIGS. 6D and 6E.

A second portion 642G of connection segment 602G includes a connection pad 644G for connection with a PCB of a hearing instrument. Second portion 642G of connection segment 602G defines a notch 646G. Notch 646G may enhance the flexibility of connection segment 602G, and thereby reduce the risk of connection segment 602G detaching from the PCB or of connection segment 602G breaking. In some examples, corners of notch 646G may be rounded or radiused.

FIG. 7 is a conceptual diagram illustrating in greater detail an example hearing device with an external antenna portion and a plurality of fibers accordance with one or more techniques of this disclosure. Although FIG. 7 is described with reference to FIGS. 3A-3C, FIG. 7 may be applicable in other examples. As shown in the example of FIG. 7, a housing component 700 defines a recess 704. Housing component 700 may be faceplate 302 or a shell. A cable 710 protrudes through housing component 700.

An external antenna portion 712 is disposed within a passage 708 defined by an outer sleeve 711 of cable 710. Fibers 706 may be secured to an inner surface of passage 708 defined by outer sleeve 711 of cable 710. A blunt feature 702 of cable 710, in combination with fibers 706, may transfer mechanical forces that would otherwise be applied to an external antenna portion 712 to housing component 700. Fibers 706 may be secured to the surface of housing component 700 using an adhesive, fastener, and the like. In other examples, such as the example of FIG. 7, fibers 706 may be configured to fold into recess 704 between blunt feature 702 and a wall of the recess of housing component 700, in this way distributing at least some of the mechanical forces applied by an external force across the larger surface areas (e.g., the surface area of the wall of the recess) of housing component 700).

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A hearing instrument comprising:

a housing that defines a cavity;

a printed circuit board (PCB) disposed within the cavity;

an antenna that comprises an internal portion and an external portion, wherein a first location on the internal portion of the antenna is disposed within the cavity and is physically connected to the PCB and a different second location on the internal portion of the antenna is physically connected to the external portion of the antenna; and a cable protruding from the housing and configured for use as a handle for removal of the hearing instrument from an ear of a user, wherein the cable encloses the external portion of the antenna, wherein the internal portion of the antenna comprises a first segment and a second segment, the first segment extending along an inner surface of a superior side of the housing from the first location to a junction with the second segment, the second segment extending along an inner surface of an anterior side of the housing and an inner surface of an inferior side of the housing.

2. The hearing instrument of claim 1, wherein the second segment further extends along an inner surface of a posterior side of the housing.

3. The hearing instrument of claim 1, wherein the first segment is substantially triangular.

4. The hearing instrument of claim 1, wherein the second segment is substantially rectangular in shape when flat, with an indentation on one side.

5. The hearing instrument of claim 1, wherein:

the internal portion of the antenna further comprises a third segment extending in an opposite direction from the second segment at the junction, and the hearing instrument further comprises an insulating strip that physically connects an end of the second segment to an end of the third segment and substantially prevents electrical current from flowing directly between the second segment and the third segment via the insulating strip.

6. The hearing instrument of claim 5 wherein: the insulating strip, the second segment of the antenna, and the third segment of the antenna form a physical ring to help secure the internal portion of the antenna within the hearing instrument.

7. The hearing instrument of claim 1, wherein the external portion of the antenna comprises two or more wires twisted around each other.

8. The hearing instrument of claim 1, wherein the external portion of the antenna comprises a copper trace.

9. The hearing instrument of claim 1, wherein the cable comprises a sleeve defining a passage within which the external portion of the antenna is disposed.

10. The hearing instrument of claim 1, wherein the antenna comprises a chip antenna physically connected to the external portion of the antenna.

* * * * *